May 15, 1945. R. WIDMER 2,376,301
DEVICE FOR CONTROLLING THE OPENING AND CLOSING OF A VARIABLE
SHUTTER FOR CINEMATOGRAPHIC PHOTOGRAPHING APPARATUS
Filed July 6, 1943 2 Sheets-Sheet 2
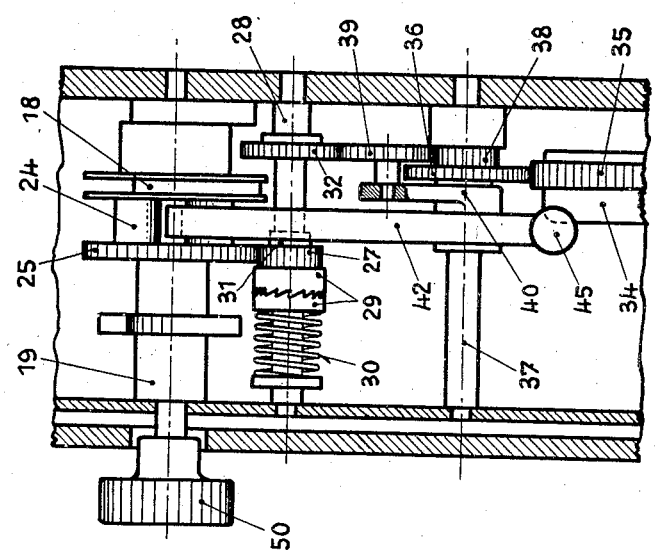
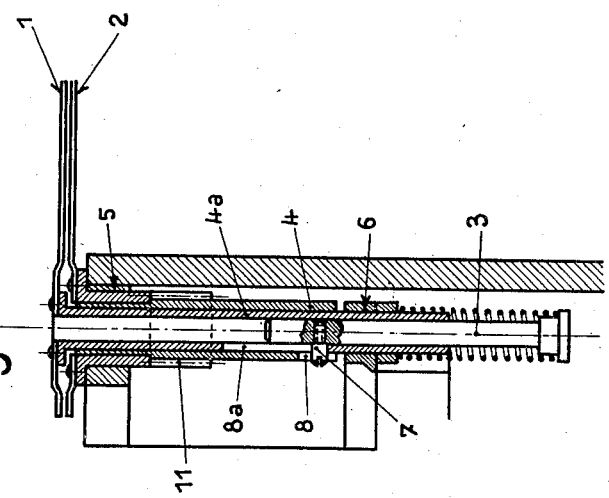
INVENTOR
RENE WIDMER,
BY *William Steen & Graff*
ATTORNEYS Patented May 15, 1945

2,376,301

UNITED STATES PATENT OFFICE 2,376,301

DEVICE FOR CONTROLLING THE OPENING AND CLOSING OF A VARIABLE SHUTTER FOR CINEMATOGRAPHIC PHOTOGRAPHING APPARATUS

René Widmer, Sainte-Croix, Switzerland, assignor to Paillard & Cie. S. A., Sainte-Croix, Switzerland, a corporation of Switzerland Application July 6, 1943, Serial No. 493,681
In Switzerland September 7, 1942

4 Claims. (Cl. 88—19.3)

In cinematographic photographing apparatus there are provided variable shutters with a progressive closing and opening and of which the control may be effected either manually or by a mechanism actuated by a separate motor or by the motor actuating the mechanism of the photographing apparatus. Some of these devices are provided with a shutter formed by two blades of similar shape and of which the relative displacement may be modified at will. Each of the blades is secured to a rotary body formed by a sleeve. These two sleeves turn one upon the other and one has a helicoidal slot while the other has a straight slot extending along a generating line. A mechanical connecting member formed by a pin engaging with the two slots connects the sleeves together mechanically. This pin is carried by a support formed by a shaft sliding inside the sleeves. An axial movement of the mechanical connecting member produces a relative angular movement of the two blades.

In some known devices the relative movements of the blades are controlled manually, in others these movements are controlled automatically. None of these known devices enables these movements to be controlled indifferently manually or automatically. This is due to the fact that for controlling these movements it is necessary to act on the shaft by means of a member exerting an axial thrust thereon and that it is thus difficult, without risking jamming, to cause two different members, one of which is controlled manually and the other automatically, to act on this shaft.

The present invention has for its subject a control device for a shutter for a cinematographic photographing apparatus, provided with blades of which one is secured to a sleeve provided with a helicoidal slot and the other to a sleeve having a straight slot, extending along a generating line, these two sleeves being connected together mechanically in such a manner that an axial movement of a mechanical connecting member produces a relative angular movement of the blades. This device eliminates the disadvantages referred to by the fact that it is provided with an actuating member exerting an axial thrust on the support of the mechanical connecting member, this actuating member being subjected, against a return action, to the action of two actuating members, one of which is operated automatically and the other manually.

A form of construction of an actuating device is shown diagrammatically and by way of example in the accompanying drawings, wherein:

Fig. 2 is an end view.

Fig. 3 is a partial view in section on the line III—III of Fig. 1.

Figure 1:
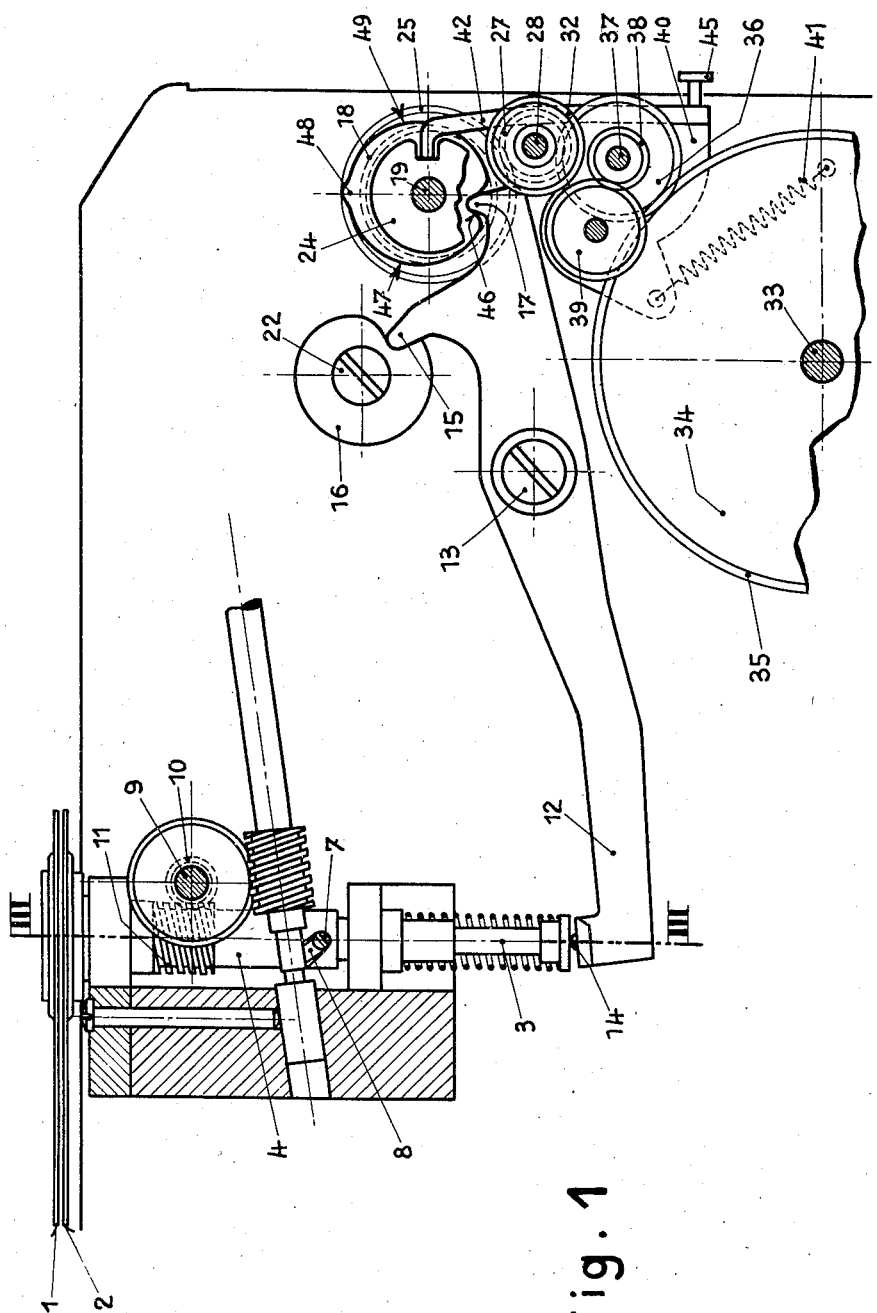
Fig. 1 is a front view, the members being in the normal position and the shutter open.

The variable shutter is formed by two blades 1 and 2, of which one is secured to a sleeve 4a having a straight slot 8a extending along a generating line and the other sleeve 4 turning on the sleeve 4a. The whole is pivoted in bearings 5 and 6 provided in a stationary part. The shaft 3 is connected mechanically to the sleeves 4 and 4a by means of a pin 7 secured to the shaft and engages with the slot 8a of the sleeve 4a and with the helicoidal slot 8 provided in the sleeve 4. The latter is driven by a motor which drives a shaft 9 carrying a helicoidal wheel 10 gearing with a helicoidal wheel 11 secured to the sleeve 4. When the mechanical connecting member for the sleeves constituted by the pin 7 is not subjected to any axial movement, the two blades 1 and 2 thus turn at the same speed. Their relative position, however, may be modified at will during the operation of the apparatus by axial movement of the shaft 3. This variation of the displacement of the blades enables the shutter to be opened or closed progressively so as to obtain fading, that is to say the progressive disappearance or appearance of a scene.

A lever 12, pivoted at 13 on a stationary part, acts on the end of the shaft 3 through the medium of a ball 14 centered on the latter. This lever 12 has two actuating fingers of which one 15 is adapted to co-operate with a cam 16 actuated manually, and of which the other finger 17 is adapted to co-operate with a cam 18 actuated automatically by a motor.

The cam 16 is secured to a shaft 22, carrying, at the end thereof emerging to the outside, an operating member (not shown) which is provided so as to be actuated manually.

The cam 18 is secured to a rocking shaft 19 carrying, amongst other members, a toothed wheel 25 and a cam 24 for the locking and the automatic control of the duration of the relative angular movement of the blades of the shutter. The toothed wheel 25 (Fig. 2) gears with a pinion 27 loosely mounted on a shaft 28 and carrying one of the parts of a clutch 29 having only one direction of drive. The second part of the clutch slides on the shaft 28 but is set angularly relatively to the latter. A spring 30 presses the two parts of the clutch against one another, the pinion 27 being retained axially by a shoulder 31 of the shaft 28. This latter has a pinion 32 keyed thereto.

The motor is of the spring type one end of the spring being connected to a stationary shaft 35

(Fig. 1) and the other to a barrel 34 provided at its periphery with a toothed flange 35. The latter gears with a toothed wheel 36 secured to a pinion 38 loosely mounted on a shaft 37. The latter pinion gears with a tooth wheel 39 pivoted on an oscillating support 40 secured to a shaft 37. A spring 41 tends to cause the support 40 and the shaft 37 to oscillate in an anti-clockwise direction. The shaft 37 also carries, rigidly secured thereto, a finger 42 adapted to co-operate with the locking cam 24. This finger is held applied to the profile of this cam by the spring 41. An operating knob 45 enables the shaft 37 to be oscillated, against the action of the spring 41, in such a manner as to disengage the finger 42 from a notch 43 provided in the cam 24 and which fixes the stop position of the shaft 19.

When the finger 42 is disengaged from the notch 43, the toothed wheel 39 comes into engagement with the toothed wheel 32. The barrel 34 then drives the cam shaft 19. The toothed wheels 39 and 32 are maintained in the engaging position by the finger 42 bearing against a circular part of the cam 24 in such a manner that the operator may release the operating knob 45 during the duration of fading.

In the position shown in the drawings, the blades 1 and 2 are placed one above the other. The variable shutter is thus in its maximum open position. In face the finger 17 is in the bottom of a notch 46 of the cam 18. When this cam turns in an anti-clockwise direction, the finger 17 rises on the ramp 47 which produces an angular movement of the lever 12. This exerts an axial thrust on the shaft 3 through the medium of the ball 14. The shaft 3 is moved axially relatively to the two sleeves 4 and 4a. This movement controls a displacement of the blades and as these are no longer covering one another they cover a larger sector.

After a rotation of 180° of the cam 18, the finger 17 is on the summit 48 of the latter. For this position the blades are displaced by 180° relatively to one another and completely cover in a continuous manner the luminous beam from the objective.

Means, not shown, then automatically stop the entire mechanism and also that for feeding the film.

During a fresh setting in operation of the photographing apparatus, the finger 17 descends a ramp 49 which controls a progressive opening of the blades. When the finger 17 enters the notch 46, the blades are again in their original position. The finger 42 falls at the same time into the notch 43 of the locking cam and stops the cam shaft 19. This movement of the finger 42 enables the support 40 to oscillate under the action of the spring 41 and the disengagement of the toothed wheels 32 and 39. The cam shaft 19 is thus stopped and locked in its normal position, whilst the mechanism for feeding the film and for actuating the shutter continues to be driven by the motor.

For effecting a fading by hand it is sufficient for the operator to turn the operating knob secured to the shaft 22. The cam 16 is then driven and controls the movements of the finger 15 of the lever 12.

By turning the shaft 22 in a clockwise direction, the operator controls the progressive closing of the shutter. A graduated scale (not shown) engraved on a part secured to the operating member moves opposite a fixed mark provided on the lateral face of the apparatus. This graduated scale indicates to the operator the relative angular position of the two blades. After complete or partial closing of the shutter, the operator may control a progressive opening of the blades by turning the shaft 22 in an anti-clockwise direction.

In some cases it is necessary, after a fading out, to reset the apparatus in operation, the blades being completely open.

When the fading out has been effected manually, the operator can return the cam 16 into the position shown before resetting the photographing apparatus in operation.

After a fading out effected automatically, however, it is necessary to de-clutch the cam shaft 19 in order to enable it to be turned for bringing it into its original position without driving the mechanism for feeding the film.

In the form of construction shown in the drawings the cam shaft 19 may be actuated manually by means of an operating knob 50. The clutch in one direction of drive isolates the cam shaft mechanically from the mechanism for one direction of drive.

By turning the knob 50 in an anti-clockwise direction the cam is actuated in its normal direction of rotation. When thus the finger 17 is at 48 it descends the ramp 49 so as to arrive at 46. At this moment the finger 42 locks the cam shaft 19. The drive is effected in this case from the cam shaft, the teeth of the two parts of the clutch 29 slipping over one another whilst compressing the spring 30 so that the entire mechanism for feeding the film and driving the shutter remains stationary during this operation.

This clutch which only drives in one direction also enables the motor of the apparatus to be wound after a fading out without modifying the position of the cam shaft 19. In fact, for rewinding the spring, the toothed flange 35 is actuated in a direction opposite to the normal direction of operation so that the teeth of the two parts of the clutch 29 slip over one another.

A form of construction of the subject of the invention has been described above by way of example, but it will be understood that any equivalent mechanical device may be used.

For example the fingers 15 and 17 may be replaced by pushers sliding in guides or pivoting on a stationary shaft and subjected to the action of springs tending to hold them in contacts with their respective cams, these pushers being capable of actuating the lever 12 independently of one another.

It may be observed that the variable shutter enables the time of exposure to be modified without changing the speed of feeding the film that is to say without changing the number of shots effected in a unit of time. In fact the displacement of the blades and thus the angle of opening of the blades may be selected at will by operating the cam 16. Finally, irrespective of the position of this cam, the automatic control of the complete closing and partial opening of the blades is effected in exactly the same manner as described above. In this case, during the automatic control of the closing of the blades, the finger 17 is only actuated after an angular movement of the cam 18, which movement varies according to the position of the cam 16. Further, during the automatic control of the opening of the blades, the finger 17 leaves the cam 18 when their opening corresponds with the opening adjusted by the cam 16.

Having now particularly described and ascertained the nature of my said invention and in what manner the same is to be performed, I declare that what I claim is:

1. A device for controlling a shutter for cinematographic photographing apparatus comprising film feeding means, a pair of coaxially and concentrically mounted hollow shafts, a shutter blade mounted on one end of each of said shafts, a helicoidal slot formed in the wall of one of said shafts and a straight slot extending along a generating line formed in the other of said shafts, a third shaft concentrically and coaxially mounted with respect to said first two shafts, said third shaft being provided with a pin adapted to cooperate with said slots, resilient means cooperating with said third shaft to constantly urge said pin toward one end of said slots, a pivoted actuating member, said actuating member having one of its ends in abutting relationship with one end of said third shaft, the other end of said member being bifurcated, a manually operated cam engaging one of said bifurcations and an automatically operating cam engaging the other of said bifurcations, said cams adapted to be rotated independently, and upon rotation of either of said cams said actuating member changes its angular position and axially displaces said third shaft whereby the angular position of said blades is correspondingly modified.

2. A device for controlling a shutter for cinematographic photographing apparatus as defined in claim 1, and means for connecting said automatically operated cam with said film feeding means during the time said shutter opens and closes, and means for automatically disengaging said connecting means when said shutter reaches its open position.

3. A device for controlling a shutter for cinematographic photographing apparatus as defined in claim 1, a cam shaft, a motor, a gear and a locking cam, said locking cam and said automatic cam being rigidly secured to said cam shaft, a pivoted element, one end of said element being adapted to engage the profile of locking cam, and a gear train mounted on the other end of said element, said motor being interconnected with said gear train, and means for oscillating said element out of locking position with said locking cam whereby said gear train may be brought into engagement with said gear.

4. A device for controlling a shutter for cinematographic photographing apparatus as defined in claim 1, and a cam shaft, a locking cam and motor means for driving said film feed means and said shutter, said locking cam and said automatically operating cam being rigidly secured to said cam shaft, and means for rotating said locking cam into locked position from any position independently of said film feeding means.

RENÉ WIDMER.